US008438415B2

(12) United States Patent
Engler et al.

(10) Patent No.: US 8,438,415 B2
(45) Date of Patent: May 7, 2013

(54) PERFORMING A PERFORM TIMING FACILITY FUNCTION INSTRUCTION FOR SYNCHRONIZING TOD CLOCKS

(75) Inventors: Eberhard Engler, Tuebingen (DE); Mark S. Farrell, Pleasant Valley, NY (US); Klaus Meissner, Herrenberg (DE); Ronald M. Smith, Sr., Wappingers Falls, NY (US); Evangelyn K. Smith, legal representative, Wappingers Falls, NY (US); Mark A. Check, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/402,554

(22) Filed: Feb. 22, 2012

(65) Prior Publication Data
US 2012/0173917 A1   Jul. 5, 2012

Related U.S. Application Data

(63) Continuation of application No. 12/540,261, filed on Aug. 12, 2009, now Pat. No. 8,135,978, which is a continuation of application No. 11/968,733, filed on Jan. 3, 2008, now Pat. No. 7,681,064, which is a continuation of application No. 11/223,886, filed on Sep. 9, 2005, now Pat. No. 7,356,725.

(51) Int. Cl.
*G06F 1/04* (2006.01)
*G04C 11/00* (2006.01)

(52) U.S. Cl.
USPC .............. 713/503; 713/400; 368/46; 368/155

(58) Field of Classification Search .................. 713/400, 713/503; 368/46, 155
See application file for complete search history.

(56) References Cited

U.S. PATENT DOCUMENTS 5,636,373 A     6/1997  Glendening et al.
6,199,169 B1 *  3/2001  Voth .............................. 713/400
(Continued)

FOREIGN PATENT DOCUMENTS

JP     59-221760     12/1984
JP      4233016      8/1992
(Continued)

OTHER PUBLICATIONS

Hennessy et al., "Computer Organization and Design: The Hardware/Software Interface", 1998, Morgan Kaufmann Publishers Inc., pp. 106-121.

*Primary Examiner* — Mark Connolly
(74) *Attorney, Agent, or Firm* — Scully, Scott, Murphy & Presser, P.C.; John E. Campbell

(57) ABSTRACT

A system, method and computer program product for steering a time-of-day (TOD) clock for a computer system having a physical clock providing a time base for executing operations that is stepped to a common oscillator. The method includes receiving, at a processing unit, a request to change a clock steering rate used to control a TOD-clock offset value for the processing unit, the TOD-clock offset defined as a function of a start time (s), a base offset (b), and a steering rate (r). The unit schedules a next episode start time with which to update the TOD-clock offset value. After updating TOD-clock offset value (d) at the scheduled time, TOD-clock offset value is added to a physical-clock value (Tr) value to obtain a logical TOD-clock value (Tb), where the logical TOD-clock value is adjustable without adjusting a stepping rate of the oscillator.

24 Claims, 4 Drawing Sheets

U.S. PATENT DOCUMENTS

| | | |
|---|---|---|
| 6,199,170 B1 | 3/2001 | Dietrich |
| 6,209,106 B1 | 3/2001 | Kubala et al. |
| 6,532,274 B1 | 3/2003 | Ruffini |
| 6,591,370 B1 | 7/2003 | Lovett et al. |
| 6,763,474 B1 | 7/2004 | Boerstier et al. |
| 6,826,123 B1 | 11/2004 | Herring |
| 7,356,725 B2 | 4/2008 | Engler et al. |
| 7,454,648 B2 | 11/2008 | Dahlen et al. |
| 2011/0320825 A1* | 12/2011 | Greiner et al. ............ 713/190 |

FOREIGN PATENT DOCUMENTS

| | | |
|---|---|---|
| JP | 07-239831 | 9/1995 |
| JP | 11073235 | 3/1999 |
| JP | 2004318878 | 12/2011 |

* cited by examiner

Old-Episode Start Time (old.s)

Old-Episode Base Offset (old.b)

OEFS Rate (old.f)

OEGS Rate (old.g)

New-Episode Start Time (new.s)

New-Episode Base Offset (new.b)

NEPS Rate (new.f)

NEGS Rate (new.g)

Current Start Time (s)

Current Base Offset (b)

C Fine S Rate (f)

C Gross S Rate (g)

C Total S Rate (r)

TOD Offset (d)

PERFORMING A PERFORM TIMING FACILITY FUNCTION INSTRUCTION FOR SYNCHRONIZING TOD CLOCKS

RELATED APPLICATIONS

This application is a continuation application of U.S. application Ser. No. 12/540,261, filed Aug. 12, 2009, which is a continuation application of U.S. application Ser. No. 11/968,733, filed Jan. 3, 2008, which is a continuation of U.S. application Ser. No. 11/223,886 that was filed on Sep. 9, 2005.

BACKGROUND

The present invention relates generally to timing signals in computer systems, and particularly, to a system and method for adjusting the Time-Of-Day (TOD) clock in computer systems for enhanced timing precision.

To provide for system integrity and data recovery in computer systems, mainframe server devices such as the zSeries® eServer®, available from assignee International Business Machines, Inc., uses the concept of a universal timestamp. Each time a data base record is updated, a recovery record is also created. The recovery record includes a timestamp obtained while the data-base record was locked. The remaining information in the recovery record is sufficient to recover the data-base record, provided the recovery records from all recovery-record data sets for all threads are sorted in sequence using the timestamps. This requires that all TOD clocks in the sysplex must have the same time.

In the past, the TOD clocks in the timing network were synchronized by means of an external box, the 9037 sysplex timer. Each Central Processing Complex (CPC) in the 9037 timing network stepped its TOD clock to the signals from the 9037. The stepping signals broadcast by the 9037 required special point-to-point links (called External Time Reference (ETR) links) from the 9037 to each CPC. Accurate communication of the stepping signals on the ETR links required a special protocol at the logical and physical signal levels that was different from any other communication protocol. A representative system implementing ETR offset values for synchronizing logical partitions of a logically partitioned machine is described in commonly-owned U.S. Pat. No. 6,209,106.

Current clock synchronization solutions address synchronization of clocks (usually separated by a significant distance) that are stepping at slightly different rates (each clock has a local oscillator). These solutions for synchronization of clocks require a two part action: 1) detecting the difference (or error) between the clocks; and, 2) making an adjustment to the oscillator frequency or stepping rate as a function of the error.

For systems that implement a timing solution that does not include a stepping signal, i.e., timing information is communicated by means of messages with time stamps and other timing information, each CPC must keep its TOD clock in step with the rest of the other CPCs by computing offsets and taking action to adjust TOD clock. This is similar to the action performed by NTP (Network Timing Protocol), the difference being that NTP is normally implemented in a software layer where time stamps can be generated by the control program. The eServer zSeries® architecture however, has very stringent requirements on the TOD clock; it can be viewed by any problem program, all timestamps must be different, timestamps must never appear to step backwards, and timestamps must appear to be increasing, even when viewed by programs running on different CPUs in the CPC.

To make the adjustments to the TOD clock required by the new timing solution, the stepping rate of the TOD clock must be speeded up or slowed down by very fine adjustments, and these adjustments must by observed simultaneously by all CPUs in the CPC. This is critical due to the fact that the time between stepping pulses to the rightmost bit of the TOD clock is comparable to the cache-to-cache transfer time between CPUs. Thus, changing the TOD as viewed by one CPU by the smallest value possible can result in the TOD clock no longer meeting the architecture requirements for the TOD clock as viewed by other CPUs in the CPC.

An alternative solution is to adjust the rate of the physical oscillator driving the TOD stepping pulse. However, there are several problems with this: 1) this solution could not be retrofitted to older machines; 2) no technology is available to provide the accuracy required (e.g., better than 2 parts per million (ppm)); 3) testing of such a circuit is very difficult; 4) it does not address the problem of coordinated discontinuities (re-synchronizing the clock after errors); and 5) it does not provide a good interface to platforms other than z/OS and TPF (Transaction Processing Facility).

It would thus be highly desirable to provide a system and method for adjusting a TOD clock in for a tightly coupled shared storage multiprocessing environment comprising multiple CPC,s where all physical clocks are already synchronized by means of a common oscillator stepping pulse.

SUMMARY

It is an object of the present invention to provide a novel Time-Of-Day (TOD) clock steering method and apparatus for mainframe server architectures having a tightly coupled shared storage multiprocessing environment (CPCs) where all physical clocks are synchronized by means of a common oscillator stepping pulse.

According to the invention, a TOD-clock steering provides a means to change the apparent stepping rate of the TOD clock without changing the physical hardware oscillator which steps the physical clock. This is accomplished by means of a TOD-offset register having contents that are added to the physical clock to produce a logical-TOD-clock value. Preferably, adjustments of the TOD clock are performed digitally by means of a shared location in hardware shared storage.

Thus, according to the invention, there is provided a system, method and computer program for steering a time of day (TOD)-clock for a computer system having a physical clock providing a time base for executing operations that is stepped to a common oscillator. The method includes receiving, at a processing unit, a request to change a clock steering rate used to control a TOD-clock offset value for the processing unit, the TOD-clock offset defined as a function of a start time (s), a base offset (b), and a steering rate (r); assigning, responsive to the received request, a new-episode start time value, new-episode base offset value, new-episode fine-steering rate value; and a new-episode gross-steering rate value; detecting a time instance of the physical clock reaching the new-episode start time value; and, automatically switching a TOD-clock to use the new-episode start time, new-episode base offset and new-episode fine and gross-steering rate values by computing a TOD clock-offset value in the new episode, where the computed TOD clock-offset value is added to a physical clock to obtain an adjusted basic-machine TOD clock value without adjusting a stepping rate of the oscillator.

The total steering rate is made up of two components, a fine-steering rate and a gross-steering rate. The fine-steering rate is used to correct that inaccuracy in the local oscillator that is stable over a relatively long period of time. The value will normally be less than the specified tolerance of the local oscillator (typically ±2.0 ppm). The gross-steering rate is used as a dynamic correction for all other effects, the most predominate being to synchronize time with an external time source and with other clocks in a timing network.

The novel apparatus and method uses mathematical formulae constructed such that clock "ticks" are never lost, even if a particular CPU is delayed for extended periods of time. An interface is provided to permit problem programs even at the second level of execution to determine and take into consideration even the finest details of TOD clock steering. These programs can obtain timing information accurate to a fraction of a part per million, even when the TOD clock is being steered at 40 parts per million, for example.

Further to this, the apparatus and method of the invention: 1) provides that all physical clocks are stepping to a common oscillator and are synchronized; 2) provides a hardware-generated signal to indicate the occurrence of a TOD offset update event. In one example embodiment, this may be triggered by a "carry" out of a bit position of the physical clock in each CPU; 3) communicates the current steering parameters to all CPUs. This is preferably accomplished by shared storage with interlocked update to change steering parameters and read-only access by all processors to minimize the overhead; and, 4) it implements a mathematical formula to compute a digital value to update the offset and be applied at precise instants of time. The mathematical formula is such that it ensures that no value is lost, even if the CPU goes to sleep for a long time.

BRIEF DESCRIPTION OF THE DRAWINGS

The objects, features and advantages of the present invention will become apparent to one skilled in the art, in view of the following detailed description taken in combination with the attached drawings, in which:

FIG. 3 provides a summary of TOD-clock-steering registers implemented according to one embodiment of the invention;

DETAILED DESCRIPTION

The present invention is directed to a Time-Of-Day (TOD) clock steering method and apparatus for mainframe server architectures having a tightly coupled shared storage multi-processing environment (CPCs) where all physical clocks are already synchronized by means of a common oscillator stepping pulse.

Figure 1:
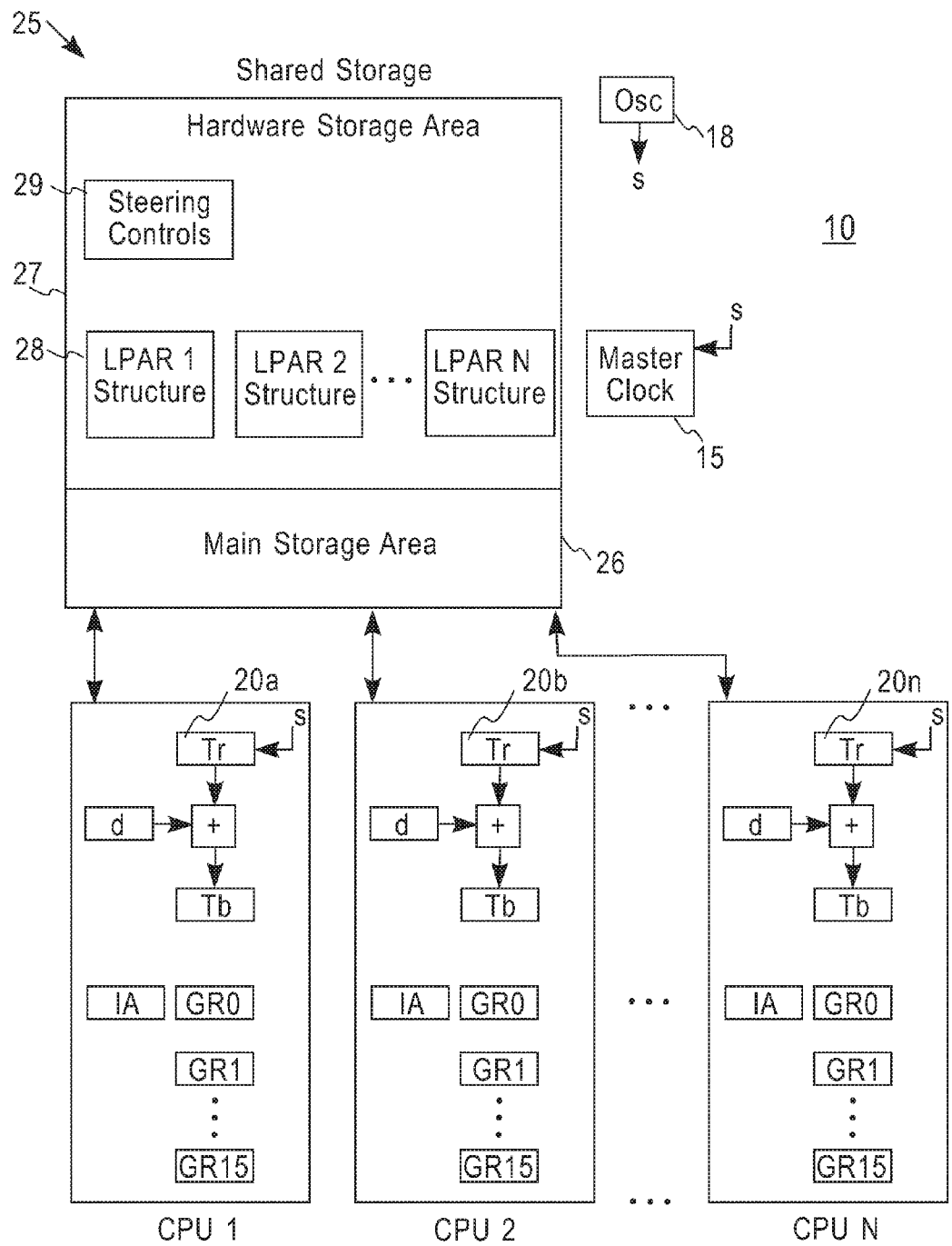
FIG. 1 is a diagram depicting the system 10 in which the present invention is implemented.

FIG. 1 is a diagram depicting the system 10 in which the present invention is implemented. The system includes a FIG. 1 shows a zSeries® eServer, referred to herein as the Central Processing Complex (CPC) having multiple CPUs labeled CPU_0, CPU_1, . . . , CPU_N. The CPC has a master clock 15 and each CPU has a slave physical clock 20a, 20b, . . . , 20n. The slave physical clocks, are set to the same value as the master clock by means well known in the art. The master clock 15 and all slave physical clocks 20a, 20b, . . . , 20n are stepped by the same stepping signal (labeled "s") generated by oscillator 18. In one illustrative embodiment, in addition to the Slave Physical Clock (labeled "Tr"), each CPU also has an Offset Register (labeled "d"), a Basic Machine Logical TOD Clock (labeled "Tb"), an instruction address register (labeled "IA"), and 16 general registers (labeled GR0-GR15). As shown, each of the CPU_0, CPU_1, . . . , CPU_N share a common storage device 25 including a main storage area 26 which is available to a program and a hardware storage area 27 that is a small portion carved out to be used "under the covers" for subchannel information, CPU-to-CPU communication, crypto buffer queues, measurement information, etc.

As known, the CPC is adapted for logical partitioning which allows the establishment of a plurality of system images within the single CPC. Logical partitioning (LPAR) structures 28 are shown in FIG. 1, representing each system image that is capable of operating as if it were a separate computer system and can be independently reset, loaded with an operating system (different for each logical partition, and operate with different software programs using different I/O devices. Moreover, each partition has its own logical partition clock "Tp" as described in greater detail with reference to FIG. 2. Each LPAR structure shown in FIG. 1 is logically represented by a state description including all the information to specify the registers (PSW, GRs, FPRs, etc.) the storage area to be used, and the controls for interception for the LPAR. With the advent of LPAR only systems, the hardware storage area 27 is the part of shared storage used for the LPAR hypervisor. Additionally shown in the system of FIG. 1 are steering controls 29 including "TOD-Clock Steering Registers" for storing clock steering values including, but not limited to: Old-Episode Start Time (old.s), Old-Episode Base Offset (old.b), Old-Episode Fine Steering (old.f), Old-Episode Gross Steering (old.g), New-Episode Start Time (new.s), New-Episode Base Offset (new.b), New-Episode Fine Steering (new.f), and, New-Episode Gross Steering (new.g). These clock steering register values will be described in further detail herein in connection with FIG. 2.

According to the invention, TOD-clock steering provides a means to change the apparent stepping rate of the TOD clock Tb without changing the physical hardware oscillator which steps the physical clock Tr. This is accomplished by means of the TOD-offset register d which is added to the physical clock Tr to produce a logical-TOD-clock value.

The TOD-offset register d nominally consists of bits, e.g., bits 0-95, which are updated every microsecond by adding a 32-bit signed value, called the current total steering rate "r", aligned with bits 64-95 of the TOD-offset register. A carry, if any, out of bit position 0 of the TOD-offset register is ignored in this addition. In models having a higher or lower resolution, the addition is performed at such a frequency, and with r appropriately aligned, that the rate of changing the TOD-offset register is the same as if r were added to bit positions 64-95 every microsecond.

It is understood that for some server (CPC) architectures, the TOD-offset register d may be less than 64 bits and is updated periodically using a mathematical formula. The mathematical formula produces a result that is equivalent to the nominal rate, and is designed such that updates are never lost, even in the case when the machine operation is suspended for long periods of time. In normal operation, the update is performed frequently enough that the effect, as observed by the program, is indistinguishable from a uniform stepping rate.

As will be described in greater detail herein, TOD-clock steering includes a semi-privileged instruction PERFORM TIMING FACILITY FUNCTION (PTFF), which includes specification of a function code and a parameter block. TOD-clock steering also includes the interpretive execution control, "timing-facility execution control," which comprises a control bit in the structure for the logical partition. This bit, when one, in the first level state description permits a supervisor program in that logical partition to execute three of the four PTFF control functions without interception.

As mentioned, TOD-clock steering permits the timing-facility control program to adjust the apparent stepping rate of the TOD clock. The stepping rate can be adjusted up to about ±122 parts per million (ppm) with precision to one part in $2^{44}$ (about 4.9 nanoseconds per day). The stepping rate can be changed in a non-disruptive manner; that is, application programs may be running in the configuration when the change is made, with an almost imperceptible effect on the programs.

The total steering rate is made up of two components, a fine-steering rate and a gross-steering rate. The fine-steering rate is used to correct that inaccuracy in the local oscillator that is stable over a relatively long period of time. The value will normally be less than the specified tolerance of the local oscillator (typically ±2.0 ppm), changes will occur infrequently (on the order of once per day to once per week), and changes will be small (typically less than ±0.2 ppm).

The gross-steering rate is used as a dynamic correction for all other effects, the most predominate being to synchronize time with an external time source and with other clocks in the timing network. The value will normally change frequently (on the order of once per second to once per minute); and the value may range up to more than ±10 ppm.

While the fine-steering rate and gross-steering rate are used by the timing facility control program for different purposes, these components are treated interchangeably in the clock adjustment algorithm. The 32-bit fine-steering rate (f) is added to the 32-bit gross-steering rate (g) to form a 32-bit current total steering rate (r); a carry, if any, out of bit position 0, is ignored in this addition. TOD-clock steering includes four control functions which are issued by the timing-facility-control program: 1) set fine-steering rate; 2) set gross-steering rate; 3) adjust TOD-offset; and 4) set TOD-offset. The set-fine-steering-rate and set-gross-steering-rate functions operate on the fine-steering-rate and gross-steering-rate registers, respectively, and can be issued without causing any discontinuity in the logical TOD clock. These functions are available only to the timing-facility-control program; however, may be used by test programs running in a logical partition with special authorization.

When operating at the basic-machine level, the set-TOD-offset and adjust-TOD-offset functions permit the logical TOD clock Tb to be set to any arbitrary value, but with a discontinuity. These functions are intended to be used by the timing-facility-control program only for initialization, testing, and in extreme error situations. When operating at the logical-partition and virtual machine levels, the set-TOD-offset function, when issued in the supervisor state, causes an interception and the function to set the TOD epoch difference in the state description to the requested value, may be emulated by the hypervisor. For programs running in a logical partition with special authorization, the set-TOD-offset and adjust-TOD-offset functions target different registers. The set-TOD-offset function is emulated by the hypervisor and operates on the TOD epoch difference as described above. The adjust-TOD-offset function operates on the TOD-offset register, and is performed by the machine without interception.

TOD-clock steering also includes several query functions which may be used, not only by the timing-facility-control program, but also by the problem program to determine the quality of the TOD clock.

Figure 2:
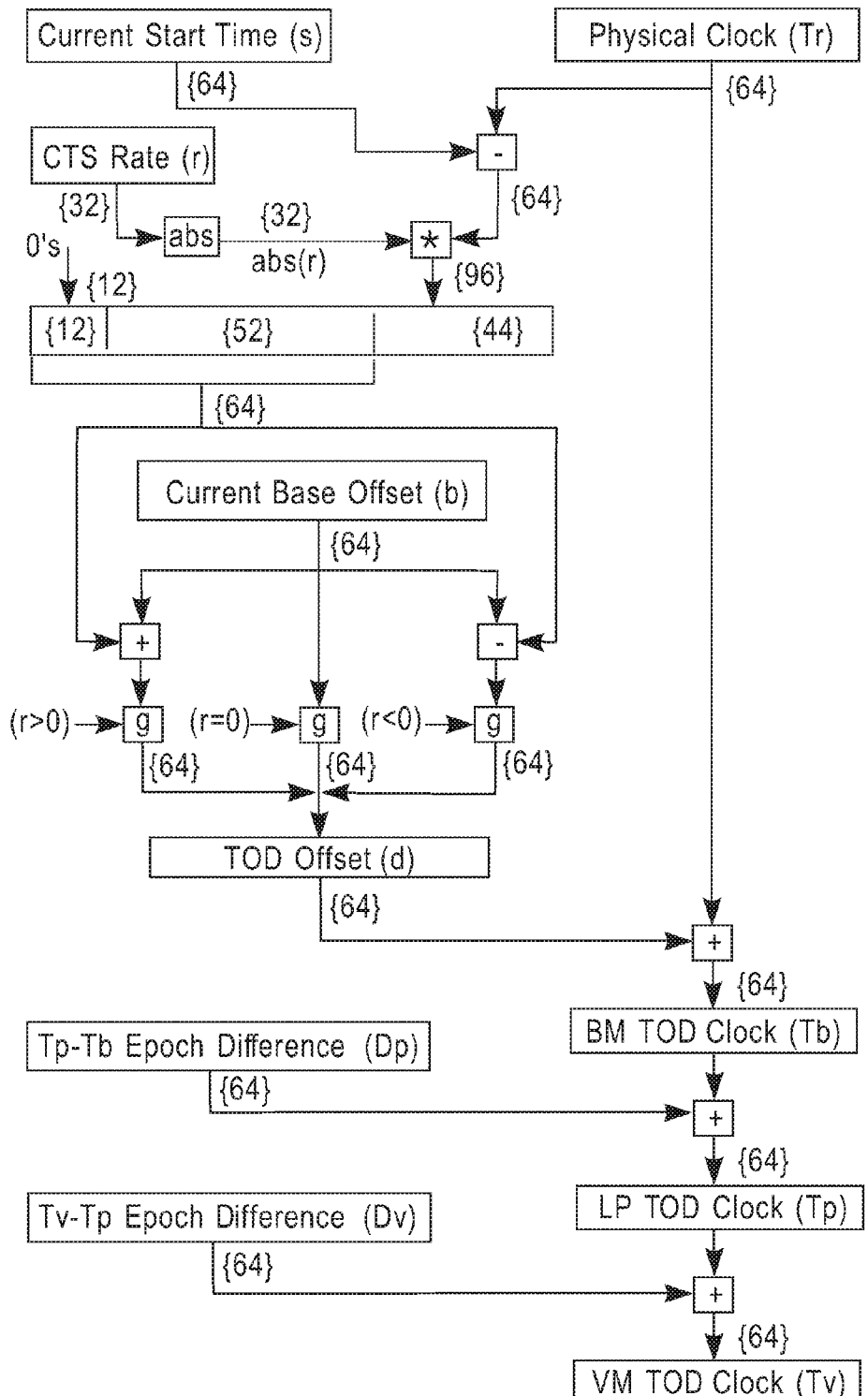
FIG. 2 depicts an overview of the TOD-clock operation according to one embodiment of the invention.

FIG. 2 depicts an overview of the TOD-clock operation, including steering. TOD-clock steering is accomplished by means of three values: a start time (s), a base offset (b), and a steering rate (r). These three values are used to compute a TOD offset (d) which is added to the physical clock (Tr) to form the basic-machine TOD clock (Tb). The start time (s) and base offset (b) are 64-bit unsigned binary integers and are considered to be aligned with bits 0-63 of the TOD clock. The steering rate is a 32-bit signed binary fixed-point value and considered to be scaled by a factor of $2^{-44}$ according to one embodiment of the invention. The following formulae show the derivation of the TOD offset (d) and basic-machine TOD clock (Tb) from the physical clock (Tr), current start time (s), current base offset (b), and current total steering rate (r):

$$d=b+(Tr-s)\cdot r\cdot 2^{-44}$$

$$Tb=Tr+d$$

Steering is also applied to the logical-partition TOD clock (Tp) and the virtual-machine TOD clock (Tv) as shown in FIG. 2.

In operation, rather than being computed continuously, the TOD offset (d) is updated periodically. This update, referred to herein as a TOD-offset-update event, is triggered by the carry out of a bit position of the physical clock. The bit position depends on the model, but is chosen such that for normal steering rates, the difference between the values computed for the TOD offset (d) by consecutive TOD-offset-update events is less than the resolution of the TOD clock.

The three values, s, b, and r, define a linear steering adjustment which can be applied indefinitely. The duration that these values are applied without being changed is called an episode. Whenever the timing-facility-control program requests a change to the steering rate, the machine schedules a new episode to take effect at a future time. To provide a smooth transition, the machine schedules the start time for the new episode to be at the next TOD-offset-update event and computes a new base offset such that there will be no discontinuity in the value of the TOD offset at the instant the new values take effect.

The machine places the new values into special registers called new-episode start time (new.s), new-episode base offset (new.b), new-episode fine-steering rate (new.f); and new-episode gross-steering rate (new.g); and the previous contents of these four registers are preserved by placing them into registers called old-episode start time (old.s), old-episode base offset (old.b), old-episode fine-steering rate (old.f), and old-episode gross-steering rate (old.g), respectively. The machine continues to use the values for the old episode until the physical clock reaches the new-episode start time (new.s) and then automatically switches to use the values for the new episode. The registers in use at any particular instant in time are called current start time (s), current base offset (b), and current total steering rate (r). These are collectively referred to as the current-episode registers.

FIG. 3 summarizes the TOD-clock-steering registers and their corresponding bit values. The contents of all TOD-clock-steering registers are initialized to zero by power-on reset.

Current Start Time (s)

When the machine is operating in the old episode, the current start time is obtained from the old-episode start time (old.s); and when in the new episode, it is obtained from the new-episode start time (new.s). The current start time (s) is a 64-bit unsigned binary integer and is considered to be aligned with bits 0-63 of the TOD clock. In the calculation of the steering adjustment, the current start time (s) is subtracted from the value of the physical clock (Tr) to form a 64-bit unsigned difference (Tr−s). A borrow (or carry) out of bit position 0 is ignored during this subtraction.

Current Base Offset (b)

When the machine is operating in the old episode, the current base offset is obtained from the old-episode base offset (old.b); and when in the new episode, it is obtained from the new-episode base offset (new.b). The current base offset (b) is a 64-bit unsigned binary integer and is considered to be aligned with bits 0-63 of the TOD clock.

Current Steering Rates (f,g,r)

When the machine is operating in the old episode, the current fine-steering rate (f) and current gross-steering rate (g) are obtained from the old-episode fine-steering rate (old.f) and gross-steering rate (old.g), respectively; when in the new episode, they are obtained from the new-episode fine-steering rate (new.f) and gross-steering rate (new.g), respectively. The current total steering rate (r) is obtained from the sum of the current fine-steering rate (f) and the current gross-steering rate (g). A carry, if any, out of bit position 0, is ignored in this addition. The current total steering rate (r) is a 32-bit signed binary fixed-point value and considered to be scaled by a factor of $2^{-44}$ according to one embodiment of the invention. The absolute value of (r), treated as a 32-bit binary unsigned number is multiplied by the 64-bit unsigned difference (Tr−s) to form a 96-bit unsigned binary product, which is shifted right by 44 bit positions to form a 52-bit intermediate result. Twelve zeros are then appended on the left to form a 64-bit adjustment value. If r is zero, the current base offset is used directly as the TOD offset and no multiplication is necessary. If r is positive, the adjustment value is added to the current base offset (b) to form the TOD offset (d); if r is negative, the adjustment value is subtracted from the current base offset (b) to form the TOD offset (d). A carry, (or borrow) occurring during this addition (or subtraction) is ignored. When r is negative, then each time an TOD-offset-update event occurs within a single episode, after computing the current TOD offset (d), the machine provides an interlock by delaying long enough to ensure that the logical TOD clock appears to step forwards as viewed by the program.

It should be understood that bits 0 and 31 of the steering-rate represent steering rates of $-2^{-13}$ and $2^{-44}$, respectively. Thus, steering rates of ±122 parts per million (10.5 seconds per day) may be specified with a precision of 4.9 nanoseconds per day.

TOD Offset (d)

The TOD offset is a 64-bit value aligned with bits 0-63 of the TOD clock. The contents of the TOD offset, treated as a 64-bit unsigned binary value are added to the physical clock to obtain the basic-machine TOD clock. A carry, if any, out of bit position 0, is ignored in this addition. Depending on the model, rightmost bits of the TOD offset corresponding to bits beyond the resolution of the TOD clock may not be implemented and are treated as zeros.

Perform Timing Facility Function

Figures 4, 5:
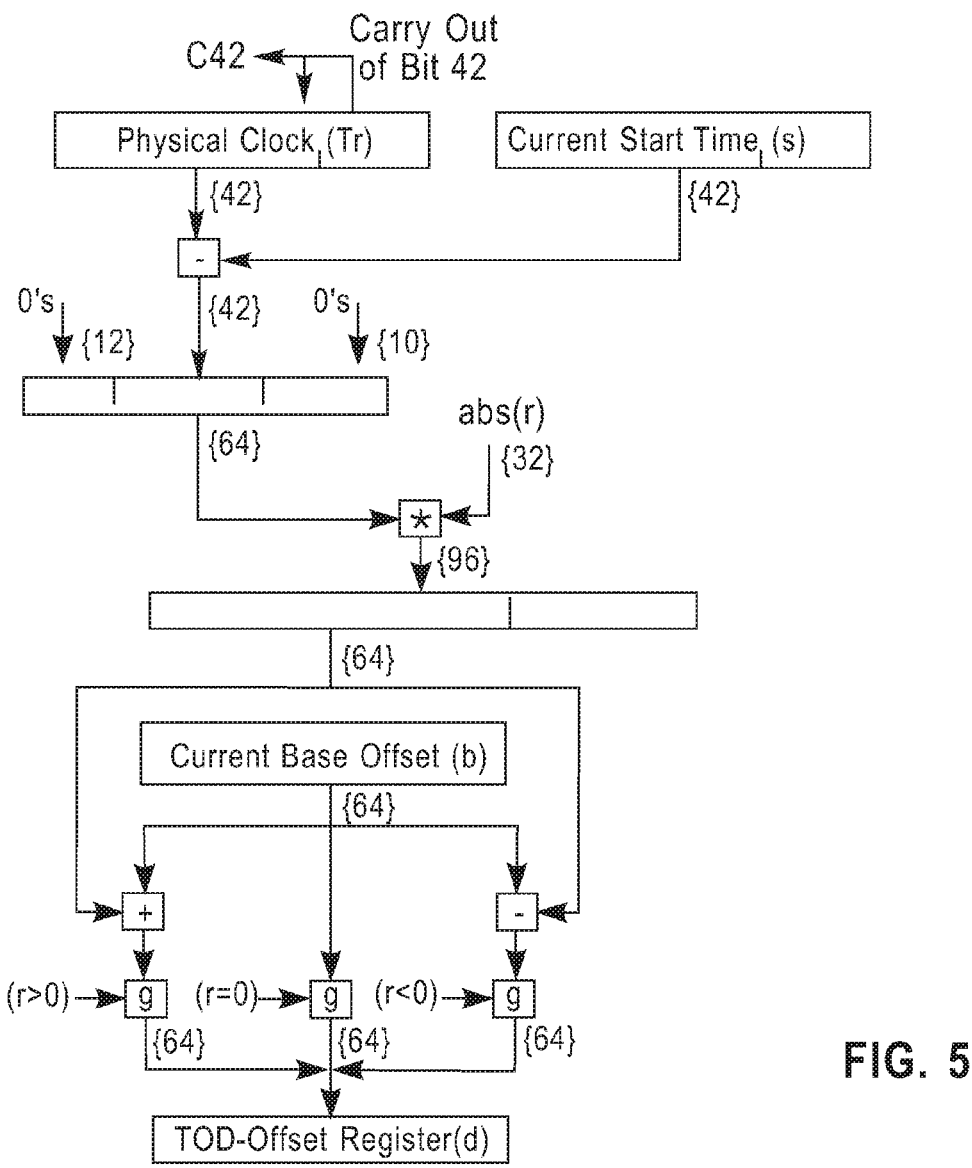
FIG. 4 illustrates symbols representing Hardware Registers implemented in the present invention, a sub-set of which are indicated in FIG. 1; and, FIG. 5 illustrates implementation details to update the TOD-offset register.

The system implements several timing facility functions specified by a function code in a general register. A condition code is set to indicate the outcome of the function, i.e., that the requested function has been performed or that the requested function is not available. Another general register contains the address of a parameter block in storage. Two types of PERFORM TIMING FACILITY FUNCTION (PTFF) functions are implemented: 1) PTFF query functions place information in the parameter block; and, 2) PTFF control functions use information obtained from the parameter block. Certain bit positions, e.g., bit positions 57-63 of a general register contain the function code. FIG. 4 shows the assigned function codes. Another general register contains the logical address of the leftmost byte of the parameter block in storage. The function codes for PERFORM TIMING FACILITY FUNCTION are as provided as follows:

| Function Codes for PERFORM TIMING FACILITY FUNCTION | | | | |
|---|---|---|---|---|
| Code | | | Parm. Block | |
| Hex | Dec | Function | Size (bytes) | Action |
| 00 | 0 | PTFF-QAF | 16 | P |
| 01 | 1 | PTFF-QTO | 32 | P |
| 02 | 2 | PTFF-QSI | 56 | P |
| 03 | 3 | PTFF-QPT | 8 | P |
| 40 | 64 | PTFF-ATO | 8 | Sb |
| 41 | 65 | PTFF-STO | 8 | Sh |
| 42 | 66 | PTFF-SFS | 4 | Sb |
| 43 | 67 | PTFF-SGS | 4 | Sb |

Explanation:
P Available in problem state at all levels of CPU execution (basic-machine, logical-partition, and virtual-machine).
Sb Available in supervisor state at the basic-machine level. May be available to the supervisor-state program at the logical-partition level, subject to special test controls.
Sh Available in supervisor state at the basic-machine level. May be available to the supervisor-state program at the logical-partition and virtual-machine levels, subject to emulation by the hypervisor.

There is now provided illustrative examples of pseudo-code subroutines indicating functions which are used to implement the invention. They are described as subroutines for purposes of brevity and to indicate the common portion for the functions calling them. Depending on the implementation, rather than a common subroutine, the code could be replicated in each routine requiring the function.

In the description of the sub-routines, reference is made to FIG. 4 which illustrates symbols for hardware registers implemented in accordance with the invention, a sub-set of which are indicated in FIG. 1. In FIG. 4, the suffix letters r, b, p, and v stand for real, basic-machine, logical-partition, and virtual machine, respectively. Logical TOD clock register Tb is not provided directly in the hardware, but is simulated as described in the pseudocode routines described herein. Clock comparator register CCb is maintained in the hardware storage area and is simulated using CCr, as described in the pseudocode routines described herein. CPU timers CTr and CTb implements the same register however both symbols are indicated for consistency with the other entries in the two columns depicted in FIG. 4. TOD-clock-sync-control register Yb, the basic-machine TOD-clock-sync control, controls the clock as observed by the program issuing a SET CLOCK (SCK) instruction. Thus, when the LPAR hypervisor issues SCK, Yb applies.

The following is a summary of other symbols used in describing the pseudocode routines described herein.

[ ] bit selection. For example, Tr[0:41] indicates that bits 0-41 of the physical clock are used;
abs(r) absolute value of r.
|| concatenation. For example, Tv[0:57]||pa6 indicates that 58 bits of the virtual-machine TOD clock are concatenated with a 6-bit processor address to form a 64-bit value;
0b111 A field of 3 one bits;
0b1111 A field of 4 one bits;
d TOD-Offset Register (implemented in each CPU);
op2 The second operand of SCK, STCK, STCKE, SCKC, STCKC, SPT, or STPT;

pa6 6-bit processor address;
pax 40-bit nonzero field containing processor address;
pr 16-bit right half of the basic-machine TOD programmable register;
r 32-bit signed binary integer indicating the current total steering rate;
SDB Steering-interface-data block. The contents of the SDB include old.s, old.b, old.f, old.g, new.s, new.b, new.f, and new.g;
t1 A 64-bit timestamp including the high-order bits (0:41 or 0:57) of the physical clock at the beginning of a pseudo-code routine;
t2 A 64-bit timestamp including the high-order bits (0:41 or 0:57) of the physical clock at the end of a pseudo-code routine. (If t2>t1, the pseudo code loops, as this indicates the routine did not finish in time);
tcs Hypervisor logical time when a guest logical clock will start;
v41 A 64-bit value with a one in bit position 41; thus representing, in TOD clock format, the time value of a carry out of bit position 42; and,
z(n) A field of n zero bits; for example, z(8) is an 8-bit field of zeros.

PTFF-QAF (Query Available Functions)
The PTFF-QAF (Query Available Functions) function provides the means of indicating the availability of the other functions. A pseudo-code description of PTFF-QAF is provided as follows:

```
pb.w1 ← 0b1111||z(28)
pb.w2 ← z(32)
pb.w3 ← 0b1111||z(28)
pb.w4 ← z(32)
```

PTFF-QTO (Query TOD Offset)
The parameter block used for the function returns values including: A 64-bit physical-clock value (pb.Tu) which is the value of the physical clock at the most recent TOD-offset-update event. The 64-bit TOD-offset value returned (pb.d) indicates the value of the TOD-offset (d). The 64-bit logical-TOD-offset value returned (pb.dl) indicates the current value being added to Tr (the physical clock) to obtain Tc (the logical TOD clock for the current level of CPU execution); and, the 64-bit TOD epoch difference value returned (pb.ed) is the TOD epoch difference for the current level of CPU execution. A pseudo-code description of PTFF-QTO is provided as follows:

```
LoopQT1
Call ccep
dl ← dc
ed ← z(64)
If sie > 0 Then
    dl ← (dl + sd1.ed)[0:63]
    ed ← sd1.ed
EndIf
If sie > 1 Then
    dl ← (dl + sd2.ed)[0:63]
    ed ← sd2.ed
EndIf
pb.Tu ← t1
pb.d ← dc
pb.dl ← dl
pb.ed ← ed
t2 ← Tr[0:41]||z(22)
If t2 > t1 Goto LoopQT1
```

PTFF-QSI (Query Steering Information)
The parameter block used for the function returns values including: A 64-bit physical-clock value (pb.Tu) is the value of the physical clock at the most recent TOD-offset-update event. The remaining fields are the values of the old-episode and new-episode registers. A pseudo-code description of PTFF-QSI is provided as follows:

```
LoopQS1
t1 ← Tr[0:41]||z(22)
pb.Tu ← t1
pb.old.s ← SDB.old.s
pb.old.b ← SDB.old.b
pb.old.f ← SDB.old.f
pb.old.g ← SDB.old.g
pb.new.s ← SDB.new.s
pb.new.b ← SDB.new.b
pb.new.f ← SDB.new.f
pb.new.g ← SDB.new.g
t2 ← Tr[0:41]||z(22)
if t2 > t1 Goto LoopQS1
```

PTFF-QPT (Query Physical Clock)
The parameter block used for the function returns values including: A 64-bit physical-clock value (pb.Tr) that is the current value of the physical clock. A pseudo-code description of PTFF-QPT is provided as follows:

pb.Tr→Tr[0:63]

PTFF-ATO (Adjust TOD Offset)
The parameter block is used for the function provides a 64-bit value (pb.a) that is treated as an unsigned-binary value, and is added to the base offset of the next episode. A carry if any, out of bit position 0 is ignored in this addition. If the next episode has already been scheduled, and has not yet become active, then the sum of pb.a and new.b replaces new.b and no other action is taken. If the next episode has not been scheduled, then the new-episode registers are saved in the old-episode registers and a new episode is scheduled. The new-episode start time (new.s) is set to the value the physical clock will have at the next TOD-offset-update event and the new-episode base offset (new.b) is set to the sum of pb.a and the value the TOD-offset would have had at that same instant, computed using the current steering parameters.

The steering rate is not changed by this function, if a new episode is scheduled, the new-episode fine-steering and gross-steering rates are the same as the current values. Execution of the adjust-TOD-offset function is interlocked such that the entire contents of the TOD-offset register appear to be updated concurrently and simultaneously as observed by all CPUs in the configuration. However, accesses to the logical TOD clocks by CPUs in the configuration are not artificially delayed; thus, addition of a large unsigned adjustment value may have the effect of a negative change and may cause the logical TOD clocks to appear to step backwards. A pseudo-code description of PTFF-ATO is provided as follows:

```
LoopAT
Lock SDB
Call cnep
SDB.new.b ← (SDB.new.b + pb.a)[0:63]
Unlock SDB
```

PTFF-STO (Set TOD Offset)
The parameter block used for the function provides a 64-bit value (pb.d) that replaces the TOD offset. When issued at the basic-machine level, if the next episode has already been scheduled, and has not yet become active, then pb.d replaces new.b and no other action is taken. If the next episode has not been scheduled, then the new-episode registers are saved in the old-episode registers and a new episode is scheduled. The new-episode start time (new.s) is set to the value the physical clock will have at the next TOD-offset-update event and the new-episode base offset (new.b) is set to the value of pb.d. The steering rate is not changed by this function, if a new episode is scheduled, the new-episode fine-steering and gross-steering rates are the same as the current values. When issued at the logical-partition or virtual-machine level, the function may be simulated by the hypervisor and operates on the TOD epoch difference for the current level of CPU execution (Dp or Dv, respectively); no new episode is scheduled and the change takes effect immediately. Execution of the set-TOD-offset function is interlocked such that the entire contents of the TOD-offset register appear to be updated concurrently and simultaneously as observed by all CPUs in the configuration. However, accesses to the logical TOD clocks by CPUs in the configuration are not artificially delayed; thus, replacement of the TOD offset by a smaller value may cause the logical TOD clocks to appear to step backwards. A pseudo-code description of PTFF-STO is provided as follows:

```
LoopST
Lock SDB
Call cnep
SDB.new.b ← pb.d
Unlock SDB
```

PTFF-SFS (Set Fine-Steering Rate)

The parameter block used for the function provides a 32-bit value (pb.f) that becomes the fine-steering rate for the next episode. If the next episode has already been scheduled, and has not yet become active, then pb.f replaces new.f and no other action is taken. If the next episode has not been scheduled, then the new-episode registers are saved in the old-episode registers and a new episode is scheduled. The new-episode start time (new.s) is set to the value the physical clock will have at the next TOD-offset-update event and the new-episode base offset (new.b) is set to the value the TOD-offset will have at that same instant, computed using the current steering parameters. The new-episode fine-steering rate (new.f) is set to pb.f and the new-episode gross-steering rate is the same as the current value. When the new episode takes effect, accesses to the logical TOD clocks by CPUs in the configuration are interlocked to ensure that the logical TOD clocks appear to be unique and monotonically increasing as observed by all programs. A pseudo-code description of PTFF-SFS is provided as follows:

```
LoopSF
Lock SDB
Call cnep
SDB.new.f ← pb.f
Unlock SDB
```

PTFF-SGS (Set Gross-Steering Rate)

The parameter block used for the function provides a 32-bit value (pb.g) that becomes the gross-steering rate for the next episode. If the next episode has already been scheduled, and has not yet become active, then pb.g replaces new.g and no other action is taken.

If the next episode has not been scheduled, then the new-episode registers are saved in the old-episode registers and a new episode is scheduled. The new-episode start time (new.s) is set to the value the physical clock will have at the next TOD-offset-update event and the new-episode base offset (new.b) is set to the value the TOD-offset will have at that same instant, computed using the current steering parameters. The new-episode gross-steering rate (new.g) is set to pb.g and the new-episode fine-steering rate is the same as the current value. When the new episode takes effect, accesses to the logical TOD clocks by CPUs in the configuration are interlocked to ensure that the logical TOD clocks appear to be unique and monotonically increasing as observed by all programs. A pseudo-code description of PTFF-SGS is provided as follows:

```
LoopSG
Lock SDB
Call cnep
SDB.new.g ← pb.g
Unlock SDB
```

TOD-Clock Steering

According to one embodiment of the invention, the steering parameters must be updated using an interlock mechanism which does not require write accesses by the read-only operations. This is especially implemented for the TOD-offset-update event. This event occurs simultaneously on every CPU periodically, e.g., every 1024 microseconds, and the overhead, if each CPU attempted to lock the information, would be prohibitive.

Conceptually, bits 0:31 of the current total steering rate (r) are added into bits 64:95 of an extension to the TOD offset (d) once every microsecond (that is, each time a carry occurs out of bit position 52 into bit position 51 of the physical clock). The architecture permits an implementation to perform this update less frequently by using the carry from a different position of the physical clock, with appropriate alignment for the addition, provided the resulting effect is essentially the same. Specifically, the architecture requires that the bit position is dependent on the model, but is chosen such that for normal steering rates, the difference between the values computed for the TOD offset (d) by consecutive TOD-offset-update events is less than the resolution of the TOD clock.

For example, if the TOD clock resolution is at bit position 57 and the TOD-offset-update event is triggered by a carry into bit position 41, then the architecture requirement is met, provided the normal steering rate is less than 16 ppm. If the oscillator is specified to be ±2 ppm, normal steering rates should be much less than 16 ppm. In this example, it is assumed the carry out of bit 42 of the physical clock is used, although this carry out bit position is configurable depending upon the implementation. A carry is propagated out of bit position 42 into bit position 41 of the physical clock periodically, e.g., every 1024 microseconds, or approximately every millisecond. Updating the steering parameters is implemented around the occurrence of this carry.

Pseudo-Code Subroutine to Compute Current Episode Parameters (ccep):

This subroutine is called by the pseudo code for the TOD-offset-update event and the query-TOD-offset function. The subroutine computes and returns the time at the most recent TOD-offset-update event (t1) and the offset (dc) for time t1. The subroutine also returns the current-episode registers: current start time (s), current base offset (b), current fine-steering rate (f), current gross-steering rate (g), and current total steering rate (r).

```
LoopC1
    t1 ← Tr[0:41]||z(22)
    If t1 < SDB.new.s Then
        s ← SDB.old.s
        b ← SDB.old.b
        f ← SDB.old.f
        g ← SDB.old.g
    Else
        s ← SDB.new.s
        b ← SDB.new.b
        f ← SDB.new.f
        g ← SDB.new.g
    EndIf
    r ← (f + g)[0:31]
    If r = 0 Then
        u ← (t1 − s)[0:63]
        w ← z(12)||u[0:41]||z(10)
        m ← abs(r)[0:31]
        p ← (w · m)[0:95]
        q ← p[0:63]
    EndIf
    If r > 0 Then
        dc ← (b + q)[0:63]
    EndIf
    If r = 0 Then
        dc ← b
    EndIf
    If r < 0 Then
        dc ← (b − q)[0:63]
    EndIf
    Exit Sub
```

Pseudo-Code Subroutine to Compute New Episode Parameters (cnep):

This subroutine is called by the pseudo code for all four PTFF control functions: adjust-TOD-offset, set-TOD-offset, set-fine-steering-rate, and set gross-steering-rate. The subroutine checks whether the new episode is active. If the current time is less than the new-episode start time (new.s) then the new episode is not yet active (the current episode is the old episode), and no other action is required. If the current time is greater than or equal to new.s then the new episode is active (the current episode is the new episode), the current episode fields (new.s, new.b, new.f, and new.g) are placed in the old-episode fields and new values are computed for new start time (new.s) and new base offset (new.b). The subroutine uses the value v41 which is a 64-bit value with a one in bit position 41; thus representing, in TOD clock format, the time value of a carry out of bit position 42.

```
t1 ← Tr[0:41]||z(22)
If t1 < SDB.new.s Then
    Exit Sub
EndIf
r ← (SDB.old.f + SDB.old.g)[0:31]
s ← (t1 + v41)[0:63]
SDB.old.s ← SDB.new.s
SDB.old.b ← SDB.new.b
SDB.old.f ← SDB.new.f
SDB.old.g ← SDB.new.g
SDB.new.s ← s
If r = 0 Then
    u ← (SDB.new.s − SDB.old.s)[0:63]
    w ← z(12)||u[0:41]||z(10)
    m ← abs(r)[0:31]
    p ← (w · m)[0:95]
    q ← p[0:63]
EndIf
If r > 0 Then
    SDB.new.b ← (SDB.old.b + q)[0:63]
EndIf
If r = 0 Then
    SDB.new.b ← SDB.old.b
EndIf
If r < 0 Then
    SDB.new.b ← (SDB.old.b − q)[0:63]
EndIf
Exit Sub
```

Pseudo-Code Subroutine for Basic-Machine Clock-Comparator Update (bmccu):

This subroutine is called by the pseudo code for the TOD-offset-update event, basic-machine SET CLOCK COMPARATOR, and action for basic-machine clock-comparator interruption. The routine adjusts the physical clock comparator to compensate for the different rates of the physical clock and basic-machine TOD clock. The routine also protects against the case when the current total steering rate (r) is negative. In this case, the physical clock is running faster than the logical TOD clock and the physical clock-comparator interruption will occur early. The routine checks for this by comparing the basic-machine TOD clock value (Tb) with the basic-machine clock-comparator (CCb). If Tb>CCb, then a basic-machine clock-comparator interruption should be taken, this is accomplished by setting the physical clock comparator to zero. If Tb≦CCb and (Tb−d)≦(CCb−d), then there is no wrap, and the physical clock-comparator value (CCr) is recalculated. If Tb≦CCb and (Tb−d)>(CCb−d), then there is a wrap. The physical clock-comparator value (CCr) is set to all ones (depicted in the pseudo-code description as −1). This creates an exposure, as the clock comparator interruption will never be taken, even though at some time in the future, the basic-machine TOD clock will be larger than the basic-machine clock comparator.

```
Tq ← Tr[0:63]
Tb ← (Tq + d)[0:63]
CCq ← (CCb − d)[0:63]
If Tb > CCb Then
    CCr ← 0
ElseIf Tq > CCq Then
    CCr ← (−1)
Else
    CCr ← CCq
EndIf
Exit Sub
```

Pseudo Code for TOD-Offset-Update Event:

FIG. 5 illustrates implementation details to update the TOD-offset register. In an example implementation, each time a carry is propagated out of bit position 42 into bit position 41 of the physical clock, before using any logical TOD clock, the TOD-offset register must be updated from the steering parameters in the hardware storage area. A pseudo-code representation is now provided that indicates the action taken on every CPU in the configuration to update the TOD-Offset Register in that CPU.

```
LoopD1
    Call ccep
    d ← dc
```

-continued

```
Call bmccu
If sie > 0 Then
    LoopD2
    t3 ← Tr[0:57]∥z(6)
    Tp ← (t3 + d + sd1.ed)[0:63]
```

Pseudo Code for Timing Instructions

The following pseudo code is provided that represents code for the handling of the following timing instructions: STORE CLOCK (STCK), STORE CLOCK EXTENDED (STCKE), SET CLOCK (SCK), SET CLOCK COMPARATOR (SCKC), SET CPU TIMER (SPT), STORE CLOCK COMPARATOR (STCKC), and STORE CPU TIMER (STPT).

| Mnem. | Basic Machine (BM) (sie = 0) | Logical Partition (sie = 1) | Virtual Machine (sie = 2) |
|---|---|---|---|
| STCK | op2 ← (Tr + d)[0:57]∥pa6 | op2 ← Tp[0:57]∥pa6 | op2 ← Tv[0:57]∥pa6 |
| STCKE | op2 ← z(8)∥(Tr + d)[0:63]∥pax∥pr | op2 ← z(8)∥Tp[0:63]∥pax∥sd1.pr | op2 ← z(8)∥Tv[0:63]∥pax∥sd2.pr |
| SCK | LoopSCK | If Yp = 1 Then | If Yv = 1 Then |
|  | Lock SDB | sd1.ed ← (op2 − tcs)[0:57]∥z(6) ψ | sd2.ed ← (op2 − tcs)[0:57]∥z(6) ψ |
|  | Tr ← op2[0:57]∥z(6) | Else | Else |
|  | SDB.old.s ← 0 | sd1.ed ← (op2 − Tb)[0:57]∥z(6) ψ | sd2.ed ← (op2 − Tp)[0:57]∥z(6) ψ |
|  | SDB.old.b ← 0 | EndIf | EndIf |
|  | SDB.old.f ← 0 |  |  |
|  | SDB.old.g ← 0 |  |  |
|  | SDB.new.s ← 0 |  |  |
|  | SDB.new.b ← 0 |  |  |
|  | SDB.new.f ← 0 |  |  |
|  | SDB.new.g ← 0 |  |  |
|  | Unlock SDB |  |  |
| SCKC | CCb ← op2 | CCp ← op2 | CCv ← op2 |
|  | Call bmccu |  |  |
| SPT | CTr ← op2 | CTp ← op2 | CTv ← op2 |
| STCKC | op2 ← CCb | op2 ← CCp | op2 ← CCv |
| STPT | op2 ← CTr | op2 ← CTp | op2 ← CTv |

Explanation:
ψ At the hardware level, when sie > 0 then SCK causes a mandatory interception. The action shown must be performed by the hypervisor.

-continued

```
    t4 ← Tr[0:57]∥z(6)
    If t4 > t3 Goto LoopD2
EndIf
If sie > 1 Then
    LoopD3
    t5 ← Tp[0:57]∥z(6)
    Tv ← (t5 + sd2.ed)[0:63]
    t6 ← Tp[0:57]∥z(6)
    If t6 > t5 Goto LoopD3
EndIf
LoopD4
w1 ← Tr[42:57]
wr ← (−r)[0:3]
If w1 ≤ wr Goto LoopD4
t2 ← Tr[0:41]∥z(22)
If t2 > t1 Goto LoopD1
```

Pseudo Code for Basic-Machine Clock-Comparator Interruption

This routine is executed just before taking a basic-machine clock-comparator interruption. The routine protects against the case when the current total steering rate (r) is negative. In this case, the physical clock is running faster than the logical TOD clock and the physical clock-comparator interruption may occur early. If the interruption is not yet due, the subroutine for basic-machine clock-comparator update is called.

```
Tb ← (Tr + d)[0:63]
If Tb > CCb Then
    Take Interruption
Else
    Call bmccu
EndIf
```

```
SIE Entry (sie=0 to sie=1):

LoopSE1
t1 ← Tr[0:57]∥z(6)
Tp ← (t1 + sd1.ed + d)[0:57]∥z(6)
t2 ← Tr[0:57]∥z(6)
If (t2 > t1) Goto LoopSE1
CCp ← sd1.cc
CTp ← sd1.ct
SIE Entry (sie=1 to sie=2):

LoopSE2
t1 ← Tp[0:57]∥z(6)
Tv ← (t1 + sd2.ed)[0:57]∥z(6)
t2 ← Tr[0:57]∥z(6)
If (t2 > t1) Goto LoopSE2
CCv ← sd2.cc
CTv ← sd2.ct
SIE Exit (sie=2 to sie=1):

sd2.cc ← CCv
sd2.ct ← CTv
SIE Exit (sie=1 to sie=0):

sd1.cc ← CCp
sd1.ct ← CTp
```

TOD-Clock-Synchronization

As seen by the CPU itself, steering of the TOD clock must not introduce an observable discontinuity in the TOD clock; in particular, the clock must not appear to step backwards, or even produce the same value twice in a row. To ensure the logical TOD clock appears to be monotonically increasing, after applying a negative delta, a CPU must delay using the TOD clock by at least the amount of the delta, as will be explained in greater detail herein below.

A more difficult requirement involves the interaction between CPUs. All CPUs must begin to use any change in the clock offset nearly simultaneously, regardless of whether the change is positive or negative. The examples show that a difference of just one clock tick, if not applied at the same instant, is enough to be detected by a problem program.

Normal operation, shown as Case 0, is used to define a value called the best-case CPU-to-CPU clock-transfer time. Case 1 and Case 2 are then shown for the introduction of the smallest possible positive or negative delta respectively, for an implementation where the new value is not recognized at the same instant on all CPUs. The examples show that positive and negative changes cause essentially the same problem and that the only practical solution is to recognize the update simultaneously on all CPUs. Synchronization of the update is solved by requiring every CPU to begin using the new value at exactly the same instant in time. This instant is referred to as a TOD-offset-update event, and is triggered when a carry occurs out of a particular bit position of the physical clock. The architecture states that the bit position chosen depends on the model. In one embodiment, the carry out of bit position 42 into bit position 41 of the physical clock is used.

Negative Change to TOD-Offset Register for a Single CPU

The following table illustrates an example of a negative change to the TOD-offset register.

| Tick No. | Physical Clock Bits 42-57 | TOD-Offset Register Bits 42-57 | Logical TOD Clock Bits 42-57 |
|---|---|---|---|
| 0 | 11 1111 1111 1111 11 | 01 0000 1000 0100 00 | 01 0000 1000 0011 11 |
| 1 | 00 0000 0000 0000 00 | 01 0000 1000 0010 00 | 01 0000 1000 0010 00 |
| 2 | 00 0000 0000 0000 01 | 01 0000 1000 0010 00 | 01 0000 1000 0010 01 |
| 3 | 00 0000 0000 0000 10 | 01 0000 1000 0010 00 | 01 0000 1000 0010 10 |
| 4 | 00 0000 0000 0000 11 | 01 0000 1000 0010 00 | 01 0000 1000 0010 11 |
| 5 | 00 0000 0000 0001 00 | 01 0000 1000 0010 00 | 01 0000 1000 0011 00 |
| 6 | 00 0000 0000 0001 01 | 01 0000 1000 0010 00 | 01 0000 1000 0011 01 |
| 7 | 00 0000 0000 0001 10 | 01 0000 1000 0010 00 | 01 0000 1000 0011 10 |
| 8 | 00 0000 0000 0001 11 | 01 0000 1000 0010 00 | 01 0000 1000 0011 11 |
| 9 | 00 0000 0000 0010 00 | 01 0000 1000 0010 00 | 01 0000 1000 0100 00 |

Each row provides a snapshot of bits 42-57 of the physical clock, the TOD-offset register, and the logical TOD clock. A snapshot is taken each time the physical clock ticks in a particular bit position, e.g., bit 57.

In this illustrative example provided in the table, the current total steering rate, which is not shown, is assumed to have the maximum negative value; that is, a one in bit position 0 followed by all zeros. The first row (tick number 0) shows the physical clock at the last tick just before a carry occurs out of bit 42. This carry will introduce a new value in the TOD-offset register which makes the logical TOD clock appear to step backwards. To avoid this from being observable to the program, the machine must not provide any logical-TOD-clock value until after tick number 9. In the example, the new value for the TOD-offset register has already been applied by the time the snapshot for tick number 1 was taken. In an actual implementation, the action to update the TOD-offset register may take considerably more time than this. The example provided in the table shows that if this update takes less than 125 nanoseconds (about 167 CPU cycles on the preferred embodiment), the machine must delay use of the clock until that much time has elapsed.

TOD-Clock-Synchronization for Multiple CPUs

Without much loss of generality, all multiple-CPU TOD-clock-synchronization failures can be simplified to the following single case:

| CPUi | CPUj |
|---|---|
| STCK A | |
| | Fetch A (new value) |
| | STCK B |
| | A > B |

On a machine with 60 CPUs, for example, bits 58-63 of the TOD-clock value are replaced by the CPU number; thus, bit 57 of the TOD clock is the rightmost stepping bit. Bit 57 of the TOD clock increments every 15.625 nanoseconds, which is only slightly less than the best case cache-to cache transfer time (e.g., 22-24 machine cycles). The most critical case is when the first CPU has a larger CPU number than the second. To show this in the examples, the CPU numbers for CPUi and CPUj are chosen to be 55 and 33 (octal), respectively. In the following table, bits 58-60 of the TOD clock are shown to indicate the passage of time, even though these bits are not part of the physical clock.

Case 0—No offset change—No Failure: Table 1 shows proper operation of TOD clocks for the case when the offset is not changing.

TABLE 1

| TOD bits 55-60 at Both CPUs | Action At CPU55 | Action At CPU33 | Comments |
|---|---|---|---|
| 100 000 | STCK A | | A = . . . 100 101 101 |
| 100 001 | | | |
| 100 010 | | | |
| 100 011 | | | |
| 100 100 | | | |
| 100 101 | | | |
| 100 110 | | | |
| 100 111 | | LG 0, A | (new value) |
| 101 000 | | STCK B | B = . . . 101 011 011 |

The sum of the execution time of the store portion of STCK on the first CPU, plus the best-case CPU-to-CPU cache-to-cache transfer time from the first CPU to the second CPU, plus the execution time of LG and the access clock portion of STCK on the second CPU is called the best-case CPU-to-CPU clock-transfer time. To ensure correct operation for Case 0, the best-case CPU-to-CPU clock-transfer time must be at least 15.625 nanoseconds. This may be accomplished, if necessary, by artificially delaying the execution time of STCK on each CPU. An alternative, which will likely be required in future hardware, is to implement bits 58-63 of the physical clock, and the machine delays the execution of STCK on a CPU until bits 58-63 of the physical clock match the CPU number for this CPU.

Case 1—Negative Offset Change—Failure: Table 2 shows a synchronization failure of the TOD clocks when the offset is decreased by 15.625 nanoseconds (the smallest change possible for a negative steering rate on the preferred embodiment) and this change is not recognized at the same time on the two CPUs. (This failure occurs only if the architecture is not followed, as the architecture requires all CPUs begin using the new value at the same instant.) In this example, the failure occurs when CPU33 has begun using the new value and CPU55 is still using the old value. (Note that, as part of using the new value, CPU33 has already delayed long enough to ensure that the logical clock, as observed by CPU33 itself, does not appear to step backwards.)

TABLE 2

| TOD Clock Bits 55-60 | | Action At | | |
|---|---|---|---|---|
| at CPU55 (old) | at CPU33 (new) | CPU55 | CPU33 | Comments |
| 100 000 | 011 000 | STCK A | | A = . . . 100 101 101 |
| 100 001 | 011 001 | | | |
| 100 010 | 011 010 | | | |
| 100 011 | 011 011 | | | |
| 100 100 | 011 100 | | | |
| 100 101 | 011 101 | | | |
| 100 110 | 011 110 | | | |
| 100 111 | 011 111 | | LG 0, A | (new value) |
| 101 000 | 100 000 | | STCK B | B = . . . 100 011 011 |

To operate correctly for Case 1, the best-case CPU-to-CPU clock-transfer time must be at least 15.625 nanoseconds plus the absolute amount of the change, and this will not normally be the case on the preferred embodiment. This example shows the failure can occur if the time between two CPUs beginning to use the new value is more than the best-case CPU-to-CPU clock-transfer time. Since the CPU using the old value is not yet aware of the change, the CPU using the new value would have to delay each execution of STCK until all CPUs have updated to the new offset; this would likely prove to be impractical unless this can be a known fixed duration.

Case 2—Positive Offset Change—Failure: Table 3 shows a synchronization failure of the TOD clocks when the offset is increased by 15.625 nanoseconds (the smallest change possible for a positive steering rate on the preferred embodiment) and this change is not recognized at the same time on the two CPUs. (This failure occurs only if the architecture is not followed, as the architecture requires all CPUs begin using the new value at the same instant.) In this example, the failure occurs when CPU55 has begun using the new value and CPU33 is still using the old value.

TABLE 3

| TOD Clock Bits 55-60 | | Action At | | |
|---|---|---|---|---|
| at CPU55 (old) | at CPU33 (new) | CPU55 | CPU33 | Comments |
| 100 000 | 011 000 | STCK A | | A = . . . 100 101 101 |
| 100 001 | 011 001 | | | |

TABLE 3-continued

| TOD Clock Bits 55-60 | | Action At | | |
|---|---|---|---|---|
| at CPU55 (old) | at CPU33 (new) | CPU55 | CPU33 | Comments |
| 100 010 | 011 010 | | | |
| 100 011 | 011 011 | | | |
| 100 100 | 011 100 | | | |
| 100 101 | 011 101 | | | |
| 100 110 | 011 110 | | | |
| 100 111 | 011 111 | | LG 0, A | (new value) |
| 101 000 | 100 000 | | STCK B | B = . . . 100 011 011 |

To operate correctly for Case 2, the best-case CPU-to-CPU clock-transfer time must be at least 15.625 nanoseconds plus the absolute amount of the change, and this will not normally be the case on the preferred embodiment. This example shows the failure can occur if the time between two CPUs beginning to use the new value is more than the best-case CPU-to-CPU clock-transfer time. Since the CPU using the old value is not yet aware of the change, the CPU using the new value would have to delay each execution of STCK until all CPUs have updated to the new offset; this would likely prove to be impractical unless this can be a known fixed duration.

The present invention has been described with reference to diagrams of methods, apparatus (systems) and computer program products according to embodiments of the invention. It will be understood that each diagram, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified herein.

These computer program instructions may also be stored in a computer-readable memory that can direct a computer or other programmable data processing apparatus to function in a particular manner, such that the instructions stored in the computer-readable memory produce an article of manufacture including instruction means which implement the functions specified herein.

The computer program instructions may also be loaded onto a computer-readable or other programmable data processing apparatus to cause a series of operational steps to be performed on the computer or other programmable apparatus to produce a computer implemented process such that the instructions which execute on the computer or other programmable apparatus provide steps for implementing the functions specified herein.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

The invention claimed is:

1. A method of steering a time of day (TOD)-clock for a shared storage multiprocessing environment comprising multiple processing units, each unit having associated physical clock synchronized by means of a common oscillator stepping pulse, said method comprising the steps of:

receiving, at a processing unit, a request to change a clock steering rate used to control a TOD-clock offset value for said processing unit, said TOD-clock offset defined as a function of a start time (s), a base offset (b), and a steering rate (r);

assigning, based on said received request, a new-episode start time value, new-episode base offset value, new-episode fine-steering rate value; and a new-episode gross-steering rate value;

detecting a time instance of said physical clock reaching said new-episode start time value; and, automatically switching a TOD-clock to use the new-episode start time, new-episode base offset and new-episode fine and gross-steering rate values by computing a TOD clock-offset value in the new episode, where said computed TOD clock-offset value is added to a physical clock to obtain an adjusted basic-machine TOD clock value without adjusting a stepping rate of said oscillator.

2. The method as claimed in claim 1, wherein based on receiving said clock steering rate change request, said processing unit scheduling a start time for the new episode to be at a next TOD-offset-update event, said next TOD-offset update event being triggered by a carry out of a pre-determined bit position n into a bit position n−1 of the physical clock.

3. The method as claimed in claim 2, further comprising: adjusting a frequency of a next TOD-offset update event by triggering at a carry out of another pre-determined bit position of the physical clock.

4. The method as claimed in claim 1, wherein said computing a TOD-clock offset value (d) in the new episode to obtain said adjusted basic-machine TOD clock value without adjusting a stepping rate of said oscillator comprises:

computing said TOD-clock offset value (d) according to:

$$d = b + (Tr-s) \cdot r$$

where (b) is said new-episode base offset value aligned with bits of (Tr), (s) is a current start time value corresponding to said new-episode start time aligned with bits of (Tr), and, (r) is a current steering rate value.

5. The method as claimed in claim 4, wherein said current steering rate value (r) is scaled by a factor of about $2^{-44}$.

6. The method as claimed in claim 4, further comprising: providing TOD-clock steering registers for holding said current d, s, b and r values.

7. The method as claimed in claim 6, wherein said computer system comprises multiple processing units, each multiple processing unit having an associated physical clock that is stepping to said common oscillator and synchronized, wherein each processing unit includes a TOD-clock offset register for holding said TOD-clock offset value (d) for computing a logical TOD clock value.

8. The method as claimed in claim 7, wherein said current steering rate value r comprises a fine-steering rate value (f) and a gross-steering rate value (g), wherein r=(f)+(g), wherein said TOD-clock steering registers for holding said g and r values, said fine-steering rate value being established to correct for inaccuracies in said oscillator, said gross-steering rate value established for dynamically correcting said steering rate in response to other events.

9. The method as claimed in claim 6, further comprising:
computing an absolute value of (r);
determining a polarity of said absolute value of (r) wherein:
if r is zero, a base offset in the current episode is used directly as the TOD offset; or
if r is a positive value, the adjustment value is added to the current base offset (b) to form the TOD offset (d); or if r is a negative value, the adjustment value is subtracted from the current base offset (b) to form the TOD offset (d).

10. The method as claimed in claim 9, further comprising:
wherein when r is negative, after computing the current TOD offset (d) each time an TOD-offset-update event occurs within a single episode, said method further comprises:
providing an interlock condition to delay the use of a new logical TOD clock value for the processing unit after applying a negative change to TOD-Offset register to ensure that the logical TOD clock appears to step forwards as viewed by a program.

11. An apparatus for steering a time of day (TOD)-clock for a shared storage multiprocessing environment comprising multiple processing units, each processing unit having associated physical clock synchronized by means of a common oscillator stepping pulse, said apparatus comprising:

a memory storage device;

a processing unit in communications with the memory, the processing unit performing a method comprising:

receiving request to change a clock steering rate used to control a TOD-clock offset value for said processing unit, said TOD-clock offset defined as a function of a start time (s), a base offset (b), and a steering rate (r);

assigning, based on said received request, a new-episode start time value, new-episode base offset value, new-episode fine-steering rate value; and a new-episode gross-steering rate value;

detecting a time instance of said physical clock reaching said new-episode start time value; and, automatically switching a TOD-clock to use the new-episode start time, new-episode base offset and new-episode fine and gross-steering rate values by computing a TOD clock-offset value in the new episode, where said computed TOD clock-offset value is added to a physical clock to obtain an adjusted basic-machine TOD clock value without adjusting a stepping rate of said oscillator.

12. The apparatus as claimed in claim 11, wherein based on receiving said clock steering rate change request, said processing unit is further configured to:

schedule a start time for the new episode to be at a next TOD-offset-update event, said next TOD-offset update event being triggered by a carry out of a pre-determined bit position n into a bit position n−1 of the physical clock.

13. The apparatus as claimed in claim 12, wherein said processing unit is further configured to: adjust a frequency of a next TOD-offset update event by triggering at a carry out of another pre-determined bit position of the physical clock.

14. The apparatus as claimed in claim 11, wherein said computing a TOD-clock offset value (d) in the new episode to obtain said adjusted basic-machine TOD clock value without adjusting a stepping rate of said oscillator comprises:

computing said TOD-clock offset value (d) according to:

$$d = b + (Tr-s) \cdot r$$

where (b) is said new-episode base offset value aligned with bits of (Tr), (s) is a current start time value corresponding to said new-episode start time aligned with bits of (Tr), and, (r) is a current steering rate value.

15. The apparatus as claimed in claim 14, wherein said current steering rate value (r) is scaled by a factor of about $2^{-44}$.

16. The apparatus as claimed in claim 14, further comprising: said multiprocessing environment including TOD-clock steering registers for holding said current d, s, b and r values.

17. The apparatus as claimed in claim 16, wherein each multiple processing unit includes an associated physical clock that is stepping to said common oscillator and synchronized, wherein each processing unit includes a TOD-clock offset register for holding said TOD-clock offset value (d) for computing a logical TOD clock value.

18. The apparatus as claimed in claim 17, wherein said current steering rate value r comprises a fine-steering rate value (f) and a gross-steering rate value (g), wherein r=(f)+(g), said TOD-clock steering registers for holding said g and r values, said fine-steering rate value being established to correct for inaccuracies in said oscillator, said gross-steering rate value established for dynamically correcting said steering rate in response to other events.

19. The apparatus as claimed in claim 16, wherein a processing unit further performs:
computing an absolute value of (r);
determining a polarity of the absolute value (r) wherein:
if r is zero, a base offset in the current episode is used directly as the TOD offset; or
if r is a positive value, the adjustment value is added to the current base offset (b) to form the TOD offset (d); or
if r is a negative value, the adjustment value is subtracted from the current base offset (b) to form the TOD offset (d).

20. The apparatus as claimed in claim 19, further comprising:
wherein when r is negative, after computing the current TOD offset (d) each time an TOD-offset-update event occurs within a single episode, said processing unit performs:
providing an interlock condition to delay the use of a new logical TOD clock value for the processing unit after applying a negative change to TOD-Offset register to ensure that the logical TOD clock appears to step forwards as viewed by a program.

21. A computer program product for steering a time of day (TOD)-clock for a shared storage multiprocessing environment comprising multiple processing units, each unit having associated physical clock synchronized by means of a common oscillator stepping pulse, the computer program product comprising:
a non-transitory storage medium readable by a processing circuit and storing instructions for execution by the processing circuit for performing a method comprising:
receiving, at a processing unit, a request to change a clock steering rate used to control a TOD-clock offset value for said processing unit, said TOD-clock offset defined as a function of a start time (s), a base offset (b), and a steering rate (r);
assigning, based on said received request, a new-episode start time value, new-episode base offset value, new-episode fine-steering rate value; and a new-episode gross-steering rate value;
detecting a time instance of said physical clock reaching said new-episode start time value; and,
automatically switching a TOD-clock to use the new-episode start time, new-episode base offset and new-episode fine and gross-steering rate values by computing a TOD clock-offset value in the new episode, where said computed TOD clock-offset value is added to a physical clock to obtain an adjusted basic-machine TOD clock value without adjusting a stepping rate of said oscillator.

22. The computer program product as claimed in claim 21, wherein based on receiving said clock steering rate change request, said processing unit scheduling a start time for the new episode to be at a next TOD-offset-update event, said next TOD-offset update event being triggered by a carry out of a pre-determined bit position n into a bit position n−1 of the physical clock.

23. The computer program product as claimed in claim 22, further comprising:
adjusting a frequency of a next TOD-offset update event by triggering at a carry out of another pre-determined bit position of the physical clock.

24. The computer program product as claimed in claim 21, wherein said computing a TOD-clock offset value (d) in the new episode to obtain said adjusted basic-machine TOD clock value without adjusting a stepping rate of said oscillator comprises:
computing said TOD-clock offset value (d) according to:

$$d=b+(Tr-s)\cdot r$$

where (b) is said new-episode base offset value aligned with bits of (Tr), (s) is a current start time value corresponding to said new-episode start time aligned with bits of (Tr), and, (r) is a current steering rate value.

\* \* \* \* \*